UNITED STATES PATENT OFFICE.

LOUIS PAIMBOEUF, OF WASHINGTON, DISTRICT OF COLUMBIA.

IMPROVEMENT IN THE MODE OF PREPARING PAINT FOR THE PROTECTION OF BUILDINGS AGAINST FIRE.

Specification forming part of Letters Patent No. 449, dated November 11, 1837.

*To all whom it may concern:*

Be it known that I, LOUIS PAIMBOEUF, of the city of Washington, in the District of Columbia, have invented an Improved Mode of Preparing Paint for the Protection of Buildings against Fire; and I do hereby declare that the following is a full and exact description thereof.

My fire-proof paint may be prepared by grinding and incorporating the ingredients used either with oil or with water, as may be preferred. That prepared with water or other aqueous fluid, however, has one advantage over that prepared with oil—namely, it dries very rapidly and affords the desired protection immediately, while that prepared with oil will not harden perfectly until the lapse of several weeks, depending upon the season of the year.

To prepare my paint I take the best quick-lime, such as when slaked forms an impalpable powder, and slake it by the addition of so much water only as is requisite to produce that effect, performing this operation in a trough or vessel, which may be covered over, so as to retain the vapor and heat as perfectly as possible, as upon this procedure I find that much of the effective strength of the composition is dependent. When the slaking has become perfect and the mass has cooled, I, in order to prepare my water-paint, add either water or skimmed milk, or a mixture of the two, to the lime in sufficient quantity to give to it the consistency of cream or that of ordinary paint. When milk is not used I add to the water a quantity of rice-paste made by boiling rice in water to a proper consistence, using about eight pounds of rice to every hundred gallons of the prepared paint. To every hundred gallons of this prepared lime mixture I add twenty pounds of alum, fifteen pounds of potash, and one bushel of common salt. These are the essential ingredients, and the proportions such as I have found to answer well. If the paint is to be white, I find it advantageous to add to these ingredients about six pounds of prepared plaster-of-paris and the same quantity of fine white clay. When the paint is not required to be white I substitute clean, well-sifted, hard-wood ashes for the potash, about two bushels being sufficient for the above quantity. In this case, also, I frequently add three or four gallons of molasses. After mingling these ingredients I first strain them through a fine strainer, and afterward grind them together in a paint-mill, when the paint is ready for use. When roofs are to be covered or when crumbling brick walls are to be coated I mix with my paint a quantity of fine white sand, in the proportion of about one pound to every ten gallons of the paint, as this addition will cause the paint to petrify, preventing leakage in roofs and binding the crumbling particles of disintegrating brick-work.

In applying this paint, excepting in very warm weather, it will be advantageous to use it as warm as it can be conveniently kept, and particular care must be taken that it be not allowed to freeze while drying, as its binding property would be thereby destroyed or much impaired. Three coats will be sufficient in all cases. In putting on the first coat the paint should be more diluted than with the others. It can be managed by any person used to the paint-brush. When the oil-paint is to be prepared I take forty gallons of good boiled linseed-oil, and to this I add such quantity of the fine dry-slaked lime as is requisite to bring it to a proper consistence for paint, and to this I add two pounds of alum, one pound of pot or of pearl ashes, and eight pounds of common salt. In this paint good wood-ashes may be substituted for the potash, eight or ten pounds being used.

This paint is to be used in the same manner as other paint, taking special care that the first coat is perfectly dry before the second is applied. Under the same circumstances the addition of a portion of white fine sand will produce a like good effect as in the water-paint.

With these paints any of the ordinary pigments may be used, so as to obtain any color which may be desired.

I do not claim to have been the first who has applied the above-named ingredients to the purpose of rendering wood incombustible, either separately or to a certain extent in combination with each other; but What I do claim as my invention or discovery is—

The combining together of lime, potash, alum, and common salt, substantially in the manner herein set forth, whether the same be combined in the proportions herein designated or in any other which will produce a like effect, and whether the other ingredients named or any similar substances be added to the water or the oil paint, prepared as above.

L. PAIMBOEUF.

Witnesses:
 THOS. P. JONES,
 CLEMENT T. FOOTE.